(12) United States Patent
Deflumere et al.

(10) Patent No.: US 9,450,669 B1
(45) Date of Patent: Sep. 20, 2016

(54) MICROCHANNEL PLATE BASED OPTICAL COMMUNICATION RECEIVER SYSTEM

(71) Applicant: BAE SYSTEMS Information And Electronic Systems Integration Inc., Nashua, NH (US)

(72) Inventors: Michael E. Deflumere, Woburn, MA (US); Paul W. Schoeck, Townsend, MA (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 636 days.

(21) Appl. No.: 13/940,308

(22) Filed: Jul. 12, 2013

Related U.S. Application Data

(60) Provisional application No. 61/670,729, filed on Jul. 12, 2012.

(51) Int. Cl.
| | |
|---|---|
| *H04B 10/60* | (2013.01) |
| *H04B 10/079* | (2013.01) |
| *H04B 10/116* | (2013.01) |
| *H04B 10/67* | (2013.01) |

(52) U.S. Cl.
CPC ......... *H04B 10/0795* (2013.01); *H04B 10/116* (2013.01); *H04B 10/60* (2013.01); *H04B 10/67* (2013.01)

(58) Field of Classification Search
CPC . H04B 10/0795; H04B 10/60; H04B 10/116
USPC .......................................................... 398/212
See application file for complete search history.

(56) References Cited

U.S. PATENT DOCUMENTS

| | | | |
|---|---|---|---|
| 5,648,862 A * | 7/1997 | Owen ................. | H04B 10/11 342/45 |
| 6,271,511 B1 | 8/2001 | Pierle | |
| 7,973,272 B2 | 7/2011 | DeFlumere et al. | |
| 7,999,216 B2 | 8/2011 | DeFlumere et al. | |
| 8,168,936 B2 | 5/2012 | DeFlumere et al. | |
| 2009/0310973 A1* | 12/2009 | Broyde ............... | H04B 10/116 398/128 |
| 2010/0302282 A1* | 12/2010 | Dobbie ............... | F41G 1/35 345/666 |
| 2011/0076024 A1* | 3/2011 | Damink .............. | H04B 10/116 398/130 |

* cited by examiner

*Primary Examiner* — Leslie Pascal
(74) *Attorney, Agent, or Firm* — Sand & Sebolt, LPA; Daniel J. Long

(57) ABSTRACT

A microchannel plate based optical communication receiving system and method of use for extracting embedded information from a covert band of modulated light. The system includes an electrically powered microchannel plate, a sense amplifier in electrical communication with the microchannel plate configured to sense a change in current across a sense resister, a demodulator in electrical communication with the sense amplifier to demodulate the band of modulated light, a data output signal exiting from the demodulator, and a receiver for receiving the data output signal and extracting a piece of covert information.

19 Claims, 3 Drawing Sheets

MICROCHANNEL PLATE BASED OPTICAL COMMUNICATION RECEIVER SYSTEM

CROSS REFERENCE TO RELATED APPLICATION

This application claims priority from U.S. Provisional Application Ser. No. 61/670,729, filed Jul. 12, 2012; the disclosure of which is incorporated herein by reference.

BACKGROUND

1. Field

The current invention relates generally to apparatus, systems and methods for optical communication. More particularly, the apparatus, systems and methods relate to extracting information from a received optical signal. Specifically, the apparatus, systems and methods relate to the amplification and demodulation of an optical signal using a changing current across a microchannel plate to communicate information over a distance.

2. Description of Related Art

Military aircraft are often used for missions or operations that require extracting, evacuating, or rescuing troops or personnel from hostile territory. These missions require the utmost precision in order to be performed successfully. One factor in improving the odds of a successful operation is remaining undetected by the enemy.

Some exemplary military aircraft used for missions or operations include fighter aircraft, attack aircraft, and bomber aircraft. The military aircraft used for these missions carry a plethora of communication devices. The communication devices include transmitters and receivers, amongst other things. Some current devices are radio-frequency (RF) based technologies that require the aircraft to carry hardware that is not always covert. Some RF communication devices are susceptible to detection, through radio means as well as being plainly audible to hostile combatants. Further, some current RF based communication devices can be jammed by ordinary hand-held devices carried by the enemy. These non-covert RF devices hinder the ability to remain undetected by the enemy, thus decreasing the odds for a successful operation.

Microchannel plate technology is utilized in Night Vision Devices or low-light sensors utilize to amplify low levels of light in creating a visible field of view for an operator. The microchannel plates within these devices operate by amplifying electrons generated by a photocathode as the electrons pass through a single microchannel extending across the plate.

A need exists for an improved way to communicate covertly with military aircraft utilizing microchannel plate technology. The present invention addresses this and other issues.

SUMMARY

The aircraft should be able to covertly receive information through a receiver from the ground or other aircraft. Together, these communication devices help improve the odds of a successful operation.

One aspect of an embodiment may provide a device configured to monitor the change in current flowing through or across a microchannel plate as electrons pass through a microchannel within the plate. The current frequency can be demodulated, extracting information and creating a data output readable by a receiver.

Another aspect of an embodiment of the invention may provide an optical communication device comprising: an electrically powered microchannel plate having a current, receiving and in communication with an optical signal waveform from a source, wherein when the optical signal is converted to a stream of electrons by a photocathode, the electrons pass through the microchannel plate the current in the plate changes; a sense amplifier in electrical communication with the microchannel plate configured to sense the change in current; and a demodulator in electrical communication with the sense amplifier to demodulate the change in current creating a data output adapted to be relay a piece of information.

Another aspect of an embodiment of the invention may provide an optical communication device comprising: an electrically powered microchannel plate having a first current, receiving an input of electrons from a photocathode generated from a modulated optical source, wherein the microchannel plate has a second current when the optical signal is received through the microchannel plate; a sense amplifier in electrical communication with the microchannel plate configured to sense a change difference of first and second current; and a demodulator in electrical communication with the sense amplifier to demodulate the change difference in current and produce a data output adapted to relay a piece of information from the source.

A further aspect of an embodiment may provide an optical communication device comprising: an electrically powered microchannel plate having a first current, the microchannel plate having a second current not equal to the first current when electrons generated by a photocathode from a modulated optical input signal passes through the microchannel plate; a sense amplifier in electrical communication with the microchannel plate configured to sense the change in current from first to second current; a demodulator in electrical communication with the sense amplifier to demodulate the change from first to second current; and a data output signal from the demodulator adapted to be read by a receiver for relaying a piece of information from the source.

Another aspect of an embodiment may provide in combination, a modulated optical signal initiated from a source, a microchannel plate, a sense resistor, a sense amplifier, a sense filter, a frequency detector, and a frequency demodulator, wherein the optical signal operates in a band of light invisible to an unaided human eye.

A further aspect of an embodiment may provide a microchannel plate optical communication receiver comprising: a modulated band of light radiating from a light source; a powered microchannel plate to receive electrons generated by a photocathode, the plate having a first current prior to receiving the electrons and having a second current as the electrons pass through the microchannel plate; and a demodulator operatively connected to the microchannel plate adapted to demodulate the electrons.

Another aspect of an embodiment may provide a method of optically transmitting information comprising the steps of: initiating a modulated light band having a frequency coded with a piece of information from a source; receiving the light band onto a photocathode to convert it to a stream of electrons; transmitting the electrons to a microchannel plate having a current; sensing a change in the current as the stream of electrons pass through the microchannel plate; detecting the frequency; demodulating the frequency; reading the demodulated frequency in combination with the change in current; and outputting a piece of information to a receiver.

Additionally, an aspect of an embodiment may provide a method of battlefield communication, comprising the steps of: using a micro channel plate to amplify an optical image to a level where the image is useful; creating and sending a signal to a display; and allowing received information to remain visible for a period of time.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1A:
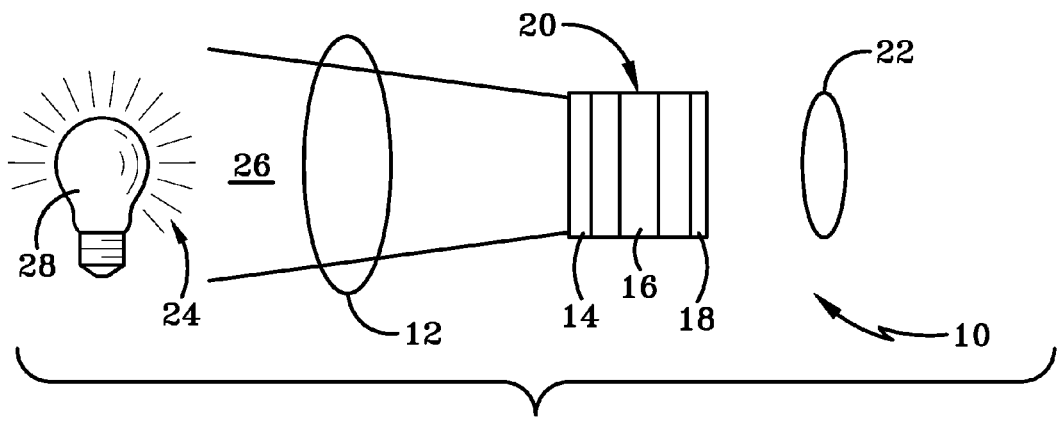
FIG. 1A is a diagrammatic view of a PRIOR ART night vision device.

FIG. 1A depicts known PRIOR ART in the field of optical amplification, otherwise known as Night Vision Devices (NVD), shown generally as 10. The NVD device 10 shown in FIG. 1A includes an objective lens 12, a photocathode 14, a Microchannel Plate (MCP) 16, a phosphor layer 18, an image tube 20 housing the photocathode 14, MCP 16, and phosphor 18, and an eyepiece 22. An exemplary NVD 10 is disclosed by U.S. Pat. No. 6,271,511, the disclosure of which is incorporated herein as if fully re-written. In NVD 10, low levels of light 24 are taken in or received from a field of view (FOV) 26 through objective lens 12. Objective lens 12 focuses bands of light 24 from FOV 26 onto photocathode 14. Photons (not shown) from the bands of light 24, or in-band optical signal, radiate from a light source 28, then impact and are detected by photocathode 14. Photocathode 14 converts the photons from the band of light optical signal 24 into electrons (not shown). Electrons then travel towards MCP 16. Microchannel plate 16 includes a circumferential rim portion (unnumbered), and within this rim portion in an active area of the MCP 16, defines a plurality of angulated microchannels (not shown), which each channel opens on an electron-receiving face plate (unnumbered) and on the opposite side is an electron-discharge face plate (unnumbered) of the MCP 16. Microchannels are separated by passage walls (not shown). At least a portion of the surface of the passage walls bounding the channels is defined by a material, which is an emitter of electrons. Both the electron-receiving and electron-discharge plates of the MCP carries a conductive electrode layer (not shown), respectively. These conductive electrode layers may be metallic, or may be formed of other conductive material so as to distribute an electrostatic charge over the respective faces of MCP 16. MCP 16 is powered or electrified via the conductive layer from a power source (not shown). For purposes of illustration and comparison, the microchannels known in the art may have a diameter of approximately 5 microns, on a spacing dimension of approximately 6 microns, with a Length/Diameter ratio of about 60, and a MCP thickness of about 300 microns. The stream of electrons passing through the channels is amplified by the electrons emitted from the channels. The amplified electron stream continues to phosphor layer 18 where it can be viewed through eyepiece 22.

Figure 1B:
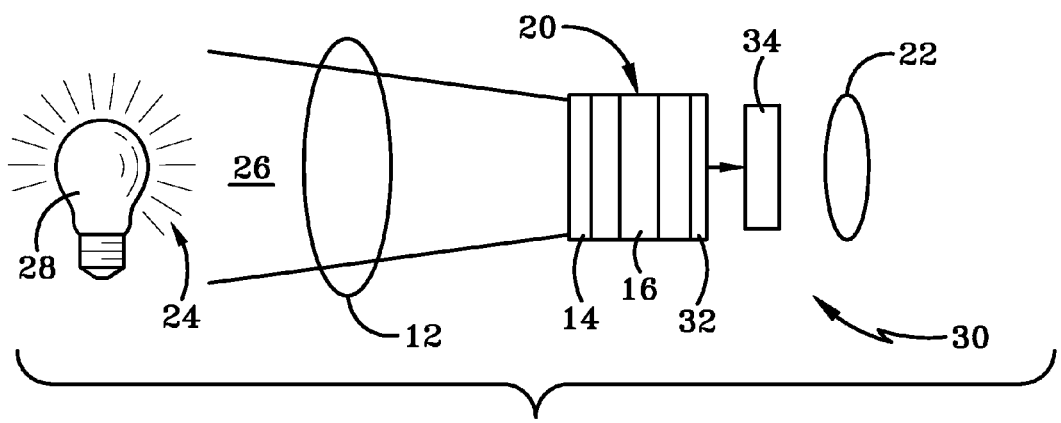
FIG. 1B is a diagrammatic view of a PRIOR ART low-light sensor.

Similar the NVD device of FIG. 1A, a low light sensor shown device 30 known in the PRIOR ART is shown in FIG. 1B including objective lens 12, a photocathode 14, MCP 16, a readout integrated circuit (ROIC) 32, an image tube 20 housing the photocathode 14, MCP 16, and ROIC 32, a display 34 and an eyepiece 22. Low levels of light 24 are taken in or received from a field of view (FOV) 26 through objective lens. Objective lens 12 focuses bands of light 24 from FOV 26 onto photocathode 14. Electron streams (not shown) emitted from photocathode 14 are propelled towards MCP 16. After the electron stream is amplified by passing through MCP 16, amplified electrons impact ROIC 32. Typically, ROIC 32 includes an array of receiving image sensors (not shown) that absorb and sense the amplified electrons. The image sensors transmit the sensed electrons to display 34 where it can be viewed through eyepiece 22.

Figure 2:
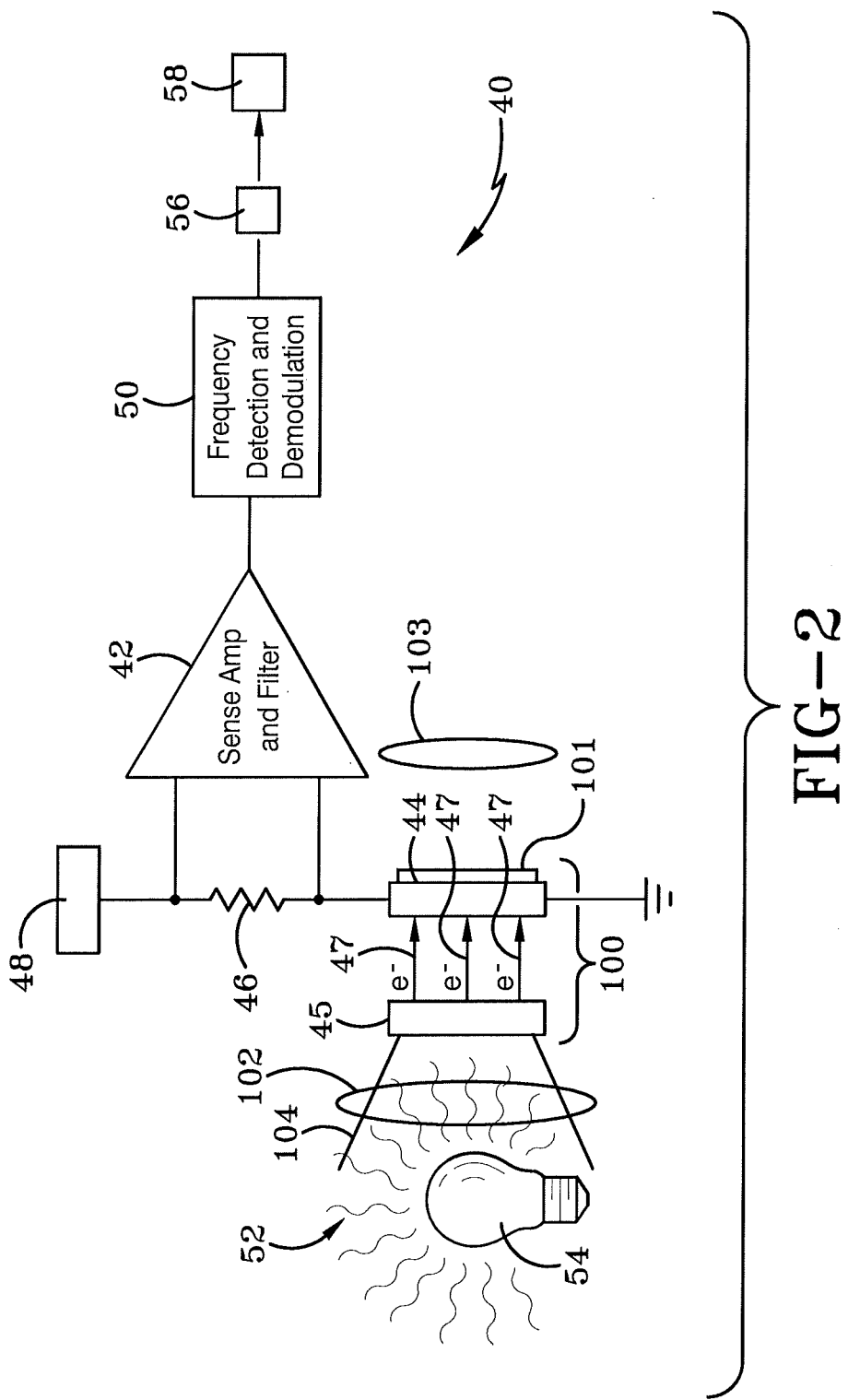
FIG. 2 is a schematic view of an embodiment of the present invention depicting a system including a photocathode, a powered microchannel plate in electrical communication with a sense resistor, a sense amplifier, a filter, a frequency detector, and a demodulator.

The embodiments of the receiver system 40 of the present invention are seen more closely in FIG. 2 which depicts an operational sense amplifier 42 in electrical communication with a MCP 44, a photocathode 45 to convert a modulated band of light or optical signal 52 into a stream of electrons 47, a sense resistor 46, a power source 48, and a frequency detection and demodulation unit 50 configured to covertly receive information from electrons 47. The modulated band of light 52 is initiated at a source 54, which is then focused from a field of view towards photocathode 45. Preferably, the modulated bands of light 52 of the present invention are covert to the naked eye, such as ultraviolet light. Photocathode 45 converts modulated light 52 into a stream of electrons 47. Electrons 47 are propelled towards MCP 44. Some exemplary MCP 44 contemplated for use in the receiver system 40 are identified in U.S. Pat. No. 8,168,936, U.S. Pat. No. 7,999,216, and U.S. Pat. No. 7,973,272 the disclosures of which are fully incorporated herein as if fully re-written. An image tube 100 houses the microchannel plate 44, and houses the photocathode 45 positioned forwardly from the MCP 44 and a phosphor layer 101 positioned rearwardly from the MCP 44. An objective lens 102 focuses a field of view 104 so that it may be directed towards an eyepiece 103.

In the shown embodiment, a sense amplifier and a sense filter (Sense Amp & Filter 42) are shown as one device 42 configured to perform both, amplification and filtering functions; however this configuration is not necessary, as the two may be split into two units, as would be understood in the art. Sense Amp & Filter 42 is electrically connected to the sense resistor 46 so that it monitors current across sense resistor 46. Sense Amp & Filter 42 senses a change in current amperes in MCP 44 by actively monitoring the resistor 46 as the modulated optical signal 52 passes through a microchannel in MCP 44. Sense Amp & Filter 42 converts the current across resistor 46 to a small voltage, which is then amplified. In this regard, it is a current sense amplifier, however other sense amplifiers, such as an operational sense amplifier could be utilized, as one would understand the art.

As optical signal 52 is converted to electrons 47 by photocathode 45. Electrons 47 pass through a microchannel of MCP 44, and electrons 47 are amplified in the manner discussed above. The amplification of the modulated electrons 47 by MCP 44 generates a voltage because of the current in the plate extends across the plate having a resistance. It is contemplated that the resistant of MCP 44 is approximately in a range from about 10 MΩ to about 100 MΩ. The voltage is amplified by a low noise circuit, shown as part of Sense Amp & Filter 42. The filter of Sense Amp & Filter 42 is set by a user to a selected modulation frequency bandpass. The filter filters out frequency that is not equal to the selected modulation frequency, which is permitted to pass through the filter. Ideally, the filter modulation frequency is equal or substantially similar to the frequency of the modulated band of light 52 received into the receiver system 40.

Frequency detection and demodulation unit 50 is electrically connected to Sense Amp & Filter 42. In the shown embodiment, a frequency detector and demodulator are shown as one device (frequency detection and demodulation unit 50) configured to perform dual functions simultaneously; however this configuration is not necessary and may be split into two distinct devices as would be understood in the art. Frequency detection and demodulation unit 50 is a circuit that is selectively operable by a user and capable of being set at a desired frequency. Unit 50 detects the frequency of modulated light band 52 relative to the change of current in MCP 44. Unit 50 is set at a modulation frequency which amplifies the optical signal 52. It is contemplated that the modulation frequency is approximately in a range from about 4 kHz to about 10 kHz. The demodulator of frequency and demodulation unit 50 demodulates the received modulated optical signal 52. Once demodulated, the information embedded in modulated signal 52 may be extracted in the form of a data output 56 by a computer device (not shown) and displayed to a receiver 58. The extraction of embedded information from the modulated optical signal 52 can be controlled by a processor or other logic.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

In operation, the system 40 of the present invention operates to communicate or otherwise transmit signals over an extended distance. Preferably, the communication will be covert and known only to a desired recipient. To initiate communication, a light source 54 or transmitter must produce the modulated band of light 52. The embodiments of the invention contemplate an inband as the light source, however other signaling light sources as understood in the art are is entirely possible.

The band of light is then modulated. Modulation can be as simple as switching the light on and off at known intervals, i.e. Morse Code, to represent words, coordinates, or other identifying information. Clearly, the modulation of the band of light can be much more complex as one having skill in the art would understand, so as to allow a sender to transmit more detailed information in the modulated band of light 52.

A typical human eye will respond or otherwise "see" light wavelengths from about 390 nm to about 700 nm. The modulated band of light 52 travels at a known frequency and preferably, to remain covert, the band of light is not within the frequency visible spectrum of light to an unaided human eye. Therefore, it is preferably that the band of light 52 have a wavelength less than about 390 nm (ultraviolet zone) or greater than about 700 nm (infrared zone). Those skilled in the art will appreciate that working outside the unaided human visible spectrum of light is advantageous for covert communications.

One featured advantage of the present invention 40 is that it does not require line of sight to operate as it can rely on a scattered optical signal from the light source 54. Once the light source 54 initiates the band of light 52, it will naturally radiate or scatter. The scattered light enters the field of view of an objective lens. Lens focuses light towards image tube containing photocathode 45, MCP 44, and Phosphor. Photocathode 45 converts the light into a stream of electrons 47 and propels electrons towards MCP 44. It will be appreciated that the bands of light have an amplitude and frequency that is quantifiable to a distance. As single electron passes through a single microchannel extending through electrified MCP 44, electrons stored in the plate cascade out of the plate into the channel from light band impacting the channel. The electron is amplified by the electrons from MCP 44 propagating through the channel. The loss of electrons cascading out of MCP 44 into the microchannel creates a change in current across MCP 44.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 3:
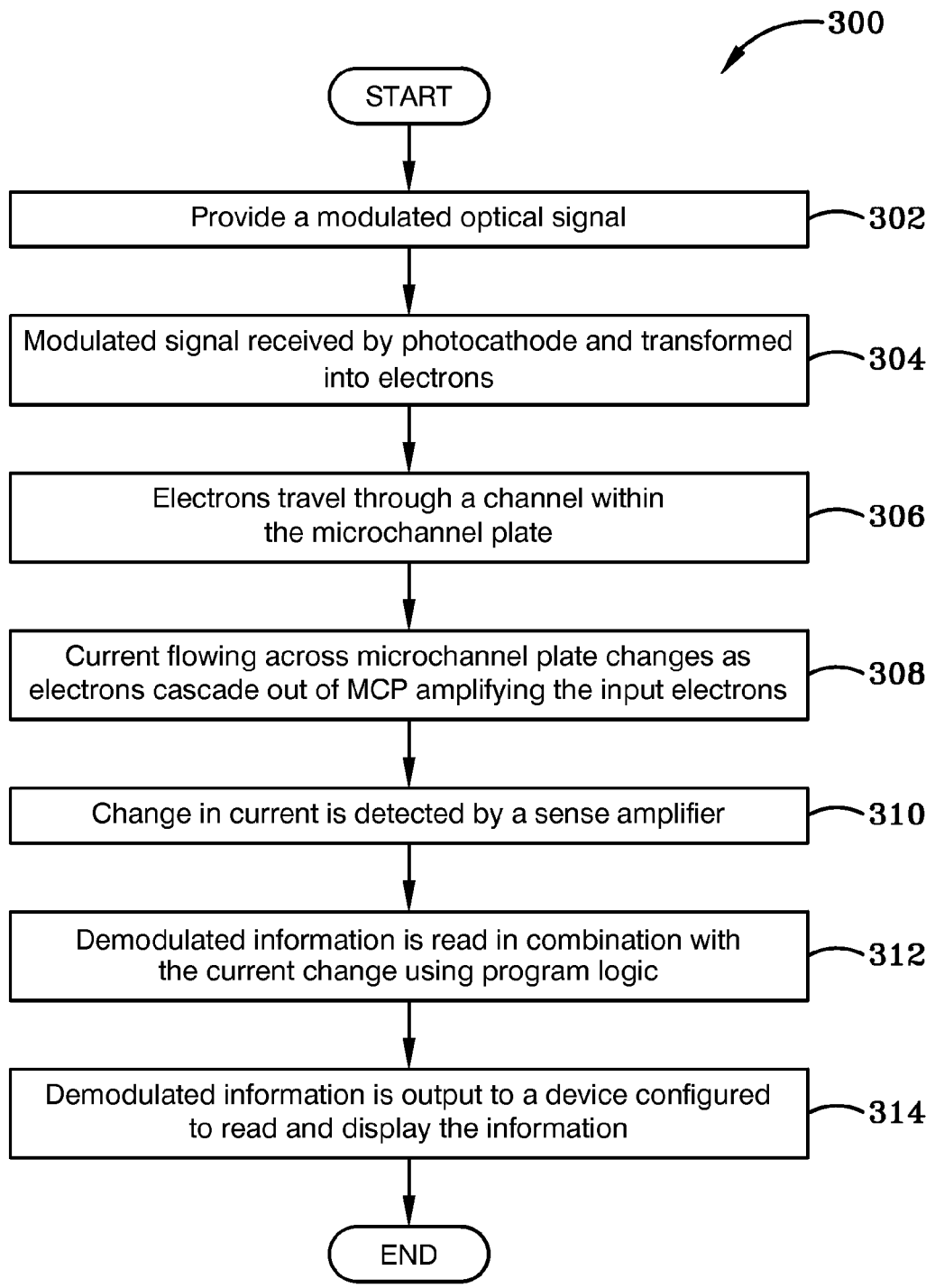
FIG. 3 illustrates an embodiment of a method for optically transmitting information using a microchannel plate receiver.

FIG. 3 illustrates a method 300 for receiving covert information from an optical signal containing using a microchannel plate based optical communication receiver. The method 300 receives an optical signal, at 402, that has been modulated or otherwise embedded with a piece of information. The modulated signal is received by a photocathode, at 304, to convert it to an electron stream. Electrons then pass through a microchannel in a microchannel plate at 306. As electrons passes through microchannel, MCP changes from first current to a second or amplified current at 308. The current through the MCP follows the modulation of the input signal. The change in current is detected and modulated light is demodulated by a frequency detection and demodulation unit at 310 to extract a piece of information. The demodulated information is read in combination with the current change using program logic at 312. Then demodulated information is then output to a device configured to read and display the information at 314.

It is to be understood that, alternative variants are contemplated by this description. Namely, while the modulation frequency ranges from approximately 4 kHz to approximately 10 kHz, other modulation frequencies are available depending on the scene or bands of light being detected. For example, when a minimal amount of data, such as global positioning coordinates (GPS), is being communicated over the optical signal 52 disclosed herein, the modulation frequency may be lower than 4 kHz which draws less power from the source. Alternatively, communicating data that has a significant amount of data, such as an audio feed, may require the modulation frequency be greater than 10 kHz and would draw more power from the power source.

It is further to be understood that placement of the optical signal source 54 and placement of the optical communication receiving device system 40 described herein can vary. One exemplary placement of the optical source is on the ground transmitting covert information via the optical signal being received by the receiving device mounted to a fighter aircraft or other military aircraft. Further, while the preferred embodiment of the communication device of the present invention is employed on the battlefield, non-battlefield use of the present invention is contemplated.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "and an example", "exemplary" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A microchannel plate based optical communication receiving system comprising:
   an optical receiver providing a stream of modulated electrons;
   an electrically powered microchannel plate, the plate having a first current prior to receiving the stream of modulated electrons and having a second current as the electrons pass through the microchannel plate;
   a sense amplifier and filter in electrical communication with the microchannel plate sensing the change in current from the first to second current, and the filter is selectively set to a modulation frequency band pass, wherein the modulation frequency band pass is similar to the frequency of the modulated electrons moving through the microchannel plate; and
   a demodulator in electrical communication with the sense amplifier to demodulate the electrons;
   a data output signal exiting from the demodulator; and
   a receiver for receiving the data output signal and extracting a piece of information.

2. The receiving system of claim 1, further comprising an image tube for housing the microchannel plate.

3. The receiving system of claim 2, wherein the image tube further comprises a photocathode positioned in front of the microchannel plate.

4. The receiving system of claim 2, wherein the image tube further comprises a phosphor positioned rearward of the microchannel plate.

5. The receiving system of claim 1 further comprising an eyepiece.

6. The receiving system of claim 1, further comprising an objective lens for viewing a field of vision, wherein a band of modulated light is located within the field of vision.

7. The receiving system of claim 1, wherein a photocathode converts modulated light to electrons which are then amplified by the microchannel plate.

8. The receiving system of claim 1, wherein the modulation frequency band pass is equal to the frequency of the modulated electrons moving through the microchannel plate.

9. The receiving system of claim 1 further comprising a sense resistor and a power supply connected to the microchannel plate.

10. The receiving system of claim 9 wherein the sense amplifier monitors the sense resistor to detect a change in current across the microchannel plate.

11. The receiving system of claim 10 wherein the sense amplifier actively monitors the sense resistor.

12. The receiving system of claim 1, wherein the microchannel plate receives a wavelength that is invisible to an unaided human eye.

13. The receiving system of claim 1, further comprising a modulation frequency from approximately 4 kHz to approximately 10 kHz.

14. The receiving system of claim 1, wherein the microchannel plate has a resistance from approximately from 10 MΩ to approximately 100 MΩ.

15. The receiving system of claim 1 wherein the receiver extracts the data output by one of a processor and a logic function.

16. A method for optically transmitting information comprising the steps of:
   initiating a modulated light band having a frequency coded with a piece of information from a source;
   receiving the light band onto a photocathode;
   converting the light band to electrons;
   transmitting the electrons to a microchannel plate having a current;
   sensing a change in the current as the electrons pass through the microchannel plate, wherein sensing the change in the current is accomplished by a sense amplifier and filter in electrical communication with the microchannel plate sensing the change in current from a first current to a second current, and the filter is selectively set to a modulation frequency band pass, wherein the modulation frequency band pass is similar to the frequency of the modulated electrons moving through the microchannel plate;
   detecting the frequency of the current;
   demodulating the detected frequency;
   reading the demodulated frequency in combination with the change in current; and
   outputting a piece of information to a receiver.

17. The method of claim 16, further comprising the step of amplifying the frequency prior to detecting the frequency.

18. A microchannel plate optical communication receiver comprising:
- a modulated band of light radiating from a light source;
- a photocathode to convert the modulated band of light to electrons;
- a powered microchannel plate to receive the electrons, the plate having a first current prior to receiving the electrons and having a second current as the electrons pass through the microchannel plate;
- a sense amplifier and filter in electrical communication with the microchannel plate configured sensing the change in current from the first current to the second current, and the filter is selectively set to a modulation frequency band pass, wherein the modulation frequency band pass is similar to the frequency of the modulated electrons moving through the microchannel plate; and
- a demodulator electrically connected to the microchannel plate.

19. The microchannel plate optical communication receiver of claim 18, wherein the modulation frequency band pass is equal to the frequency of the modulated electrons moving through the microchannel plate.

* * * * *